(12) United States Patent
Park et al.

(10) Patent No.: US 11,322,811 B2
(45) Date of Patent: May 3, 2022

(54) METHOD FOR IMPROVING LIFESPAN OF LITHIUM SECONDARY BATTERY

(71) Applicant: LG CHEM, LTD., Seoul (KR)

(72) Inventors: Gi Su Park, Daejeon (KR); Seong Ho Lee, Daejeon (KR); Byounghyo Jung, Daejeon (KR); Hyunsoo Lee, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 297 days.

(21) Appl. No.: 16/646,523

(22) PCT Filed: Nov. 6, 2018

(86) PCT No.: PCT/KR2018/013377
§ 371 (c)(1),
(2) Date: Mar. 11, 2020

(87) PCT Pub. No.: WO2019/093735
PCT Pub. Date: May 16, 2019

(65) Prior Publication Data
US 2020/0274134 A1    Aug. 27, 2020

(30) Foreign Application Priority Data
Nov. 8, 2017  (KR) ........................ 10-2017-0147836

(51) Int. Cl.
*H01M 50/60*   (2021.01)
*H01M 10/052*  (2010.01)
(Continued)

(52) U.S. Cl.
CPC ......... *H01M 50/60* (2021.01); *H01M 10/052* (2013.01); *H01M 10/058* (2013.01);
(Continued)

(58) Field of Classification Search
CPC .............. H01M 50/60; H01M 10/052; H01M 10/0569; H01M 10/058; H01M 10/446
See application file for complete search history.

(56) References Cited

U.S. PATENT DOCUMENTS

2002/0160257 A1   10/2002  Lee et al.
2002/0160258 A1   10/2002  Lee et al.
(Continued)

FOREIGN PATENT DOCUMENTS

CN    101335364 A    12/2008
CN    106848111 A     6/2017
(Continued)

OTHER PUBLICATIONS

International Search Report for PCT/KR2018/013377 (PCT/ISA/210) dated Feb. 12, 2019.
(Continued)

*Primary Examiner* — Sarah A. Slifka
(74) *Attorney, Agent, or Firm* — Birch, Stewart, Kolasch & Birch, LLP

(57) ABSTRACT

A method for enhancing a lifetime of a lithium secondary battery including manufacturing a battery by injecting an electrolyte liquid to an electrode assembly-embedded battery; and charging and discharging the manufactured battery; and additionally injecting an electrolyte liquid earlier than half a cycle point with respect to the number of charge and discharge cycles reaching discharge capacity of 80% compared to initial capacity is provided.

9 Claims, 2 Drawing Sheets

(51) Int. Cl.
*H01M 10/0569* (2010.01)
*H01M 10/058* (2010.01)
*H01M 10/44* (2006.01)

(52) U.S. Cl.
CPC ..... *H01M 10/0569* (2013.01); *H01M 10/446* (2013.01); *H01M 2300/0028* (2013.01)

(56) References Cited

U.S. PATENT DOCUMENTS

| | | |
|---|---|---|
| 2003/0013012 A1 | 1/2003 | Ahn et al. |
| 2004/0029016 A1 | 2/2004 | Hwang et al. |
| 2009/0106970 A1 | 4/2009 | Fan et al. |

FOREIGN PATENT DOCUMENTS

| | | |
|---|---|---|
| JP | 2006-294282 A | 10/2006 |
| JP | 2007-257942 A | 10/2007 |
| JP | 2009-199756 A | 9/2009 |
| JP | 2010-129192 A | 6/2010 |
| JP | 2014-127317 A | 7/2014 |
| JP | 2015-130310 A | 7/2015 |
| JP | 2017-152259 A | 8/2017 |
| KR | 2001-0082058 A | 8/2001 |
| KR | 2001-0082059 A | 8/2001 |
| KR | 2001-0082060 A | 8/2001 |
| KR | 2003-0092662 A | 12/2003 |
| KR | 10-2004-0014163 A | 2/2004 |
| KR | 10-2017-0089477 A | 8/2017 |

OTHER PUBLICATIONS

Extended European Search Report for European Application No. 18875418.8, dated Sep. 14, 2020.

[Figure 2]
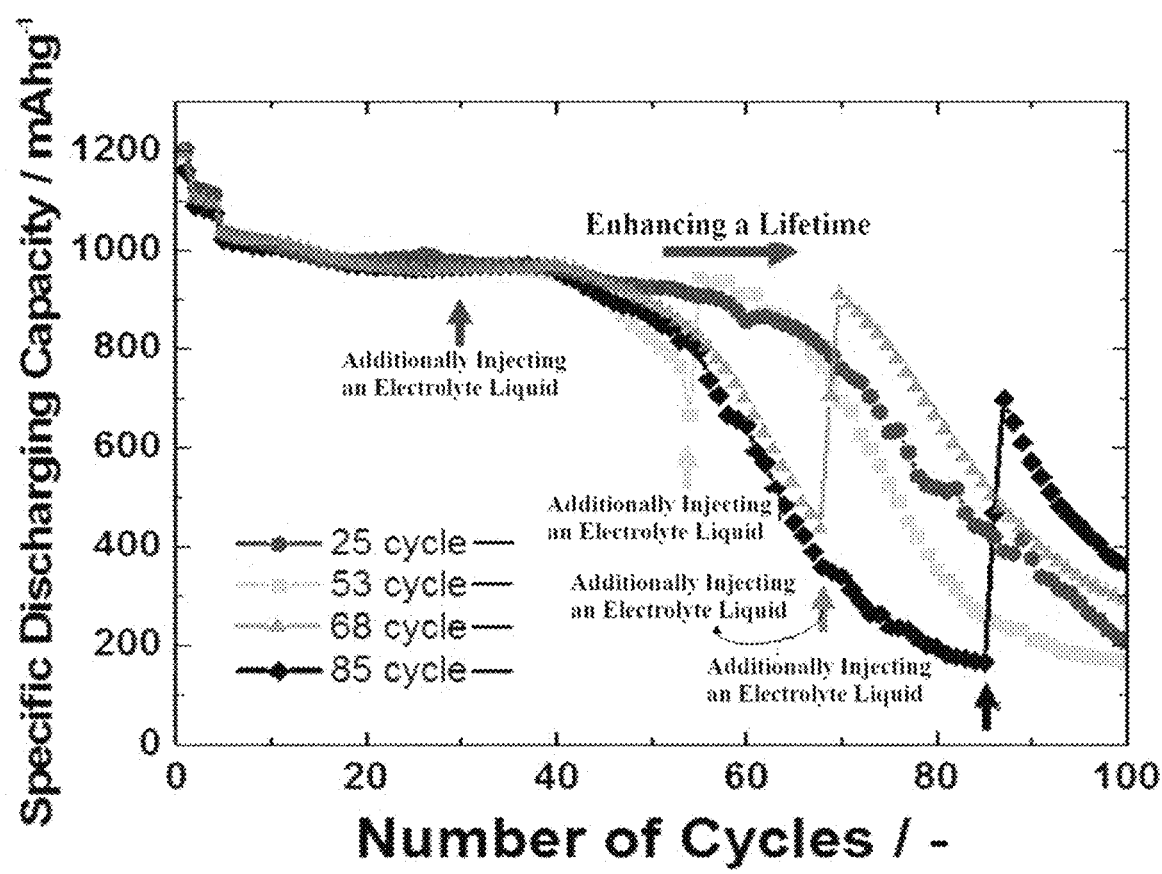

METHOD FOR IMPROVING LIFESPAN OF LITHIUM SECONDARY BATTERY

TECHNICAL FIELD

This application claims priority to and the benefits of Korean Patent Application No. 10-2017-0147836, filed with the Korean Intellectual Property Office on Nov. 8, 2017, the entire contents of which are incorporated herein by reference.

The present invention relates to a method for enhancing a lifetime of a lithium secondary battery.

BACKGROUND ART

With increases in technology developments and demands for mobile devices, demands for secondary batteries as an energy source have rapidly increased. Among such secondary batteries, lithium secondary batteries having high energy density and operating potential, a long cycle lifetime and a low self-discharge rate have been commercialized and widely used.

In addition, as interests in environmental problems have recently increased, extensive studies on electric vehicles (EV), hybrid electric vehicles (HEV) and the like that may replace vehicles using fossil fuel such as gasoline vehicles and diesel vehicles, one of major reasons of air pollution, have been progressed. Nickel hydrogen metal (Ni-MH) secondary batteries are normally used as a power source of such electric vehicles (EV), hybrid electric vehicles (HEV) and the like, however, demands for lithium secondary batteries having high energy density, high discharge voltage and output stability have increased.

Among many lithium secondary batteries, a lithium-sulfur battery using a sulfur-based compound having sulfur-sulfur bonds as a positive electrode active material, and using an alkali metal such as lithium, a carbon-based material having intercalation and deintercalation of metal ions such as lithium ions, or silicon or tin forming an alloy with lithium as a negative electrode active material is a battery exhibiting 2500 Wh/kg, 5 times higher theoretical energy density compared to existing lithium ion batteries, and thereby capable of obtaining high output and high energy density. In addition thereto, sulfur used as the positive electrode active material has advantages of being low-priced, readily supplied and environmental-friendly.

However, despite the advantages described above, it has been difficult to commercialize a lithium-sulfur battery due to problems of decreasing capacity and lifetime caused by a reaction of polysulfide, a discharge product, with an electrolyte liquid.

A lithium secondary battery including a lithium-sulfur battery has a structure in which a non-aqueous electrolyte including a lithium salt is impregnated into an electrode assembly including a positive electrode and a negative electrode each having an active material coated on a current collector, and a porous separator provided therebetween. When the non-aqueous electrolyte is not sufficiently impregnated into the electrodes, an electrochemical reaction does not occur, and capacity may decrease or electrochemical performance may decline.

Accordingly, processes of injecting and impregnating an electrolyte liquid are very important in the manufacturing process in order to sufficiently utilize a lithium-sulfur battery with high energy density.

For this, an electrolyte liquid needs to be injected in a proper amount in a lithium-sulfur battery. When an electrolyte liquid is injected in excess, lithium polysulfide (LiPS) elution increases accelerating lifetime degradation. In addition, when injecting a small amount of an electrolyte liquid, performance is not properly obtained due to an overvoltage.

However, even when a proper amount of an electrolyte liquid is injected, the electrolyte liquid is depleted by a volume expansion of a negative electrode as a charge and discharge cycle progresses causing an overvoltage, which leads to a problem of cell degradation.

Accordingly, development of methods for enhancing a lifetime of a lithium secondary battery, which injects an electrolyte liquid as charge and discharge cycles progress so as to enhance battery properties, has been more required.

PRIOR ART DOCUMENTS (Patent Document 1) Korean Patent Application Laid-Open Publication No. 2004-0014163 "Polymer electrolyte for lithium-sulfur battery and lithium-sulfur battery including the same"

DISCLOSURE

Technical Problem

As a result of extensive studies, the inventors of the present invention have identified that, when charging and discharging a manufactured battery, battery lifetime properties are enhanced when additionally injecting a certain amount of an electrolyte liquid before a certain point in time based on the number of charge and discharge cycles becoming a specific capacity value compared to initial capacity, and have completed the present invention.

Accordingly, an aspect of the present invention provides a method for enhancing a lifetime of a lithium secondary battery capable of enhancing lifetime properties of a battery by injecting a certain amount of an electrolyte liquid before a specific point in time in a lithium secondary battery.

Technical Solution

According to an aspect of the present invention, there is provided a method for enhancing a lifetime of a lithium secondary battery including a) manufacturing the battery by initially injecting an electrolyte liquid to an electrode assembly embedded in a battery case; b) charging and discharging the manufactured battery; and injecting an additional amount of electrolyte liquid earlier into the manufactured battery at a first cycle point that is earlier than half a cycle point in which a number of charge and discharge cycles causes the manufactured battery to reach a discharge capacity of 80% compared to an initial capacity of the manufactured battery.

According to another aspect, the additional amount of the injected electrolyte liquid may be from 50% by volume to 100% by volume with respect to an amount of the initially injected electrolyte liquid.

According to yet another aspect, the first cycle point may be a 20 to 30 cycle point.

According to still another aspect, the electrolyte liquid may be an ether-based electrolyte liquid. For example, the ether-based electrolyte liquid may be one or more selected from the group consisting of dibutyl ether, 2-methyltetrahydrofuran, tetrahydrofuran, dimethyl ether, ethylene glycol dimethyl ether, diethylene glycol dimethyl ether, diethylene glycol diethyl ether, triethylene glycol dimethyl ether and triethylene glycol diethyl ether.

According to a different aspect, the electrode assembly may be a winding-type, a stack-type, or a stack/folding-type.

According another aspect, the electrode assembly may be a unidirectional cell or a bidirectional cell.

According to a further aspect, the battery case may be a pouch-type formed with a pair of laminate sheets having a structure in which three surfaces are sealed so as to accommodate the electrode assembly therein.

According to still another aspect, the manufactured battery may include a positive electrode; a negative electrode including lithium metal or a lithium alloy as a negative electrode active material; a separator provided between the positive electrode and the negative electrode. The electrolyte liquid may be impregnated in the negative electrode, the positive electrode and the separator. A sulfur compound may be included in a positive electrode active material of the positive electrode.

Advantageous Effects

The present invention is effective in enhancing lifetime properties of a lithium secondary battery just by using a method of injecting a certain amount of an electrolyte liquid before a specific point in time.

DESCRIPTION OF DRAWINGS

FIG. 2 is a graph showing changes in lifetime properties of lithium secondary batteries according to examples and comparative examples of the present invention.

BEST MODE

Figure 1:
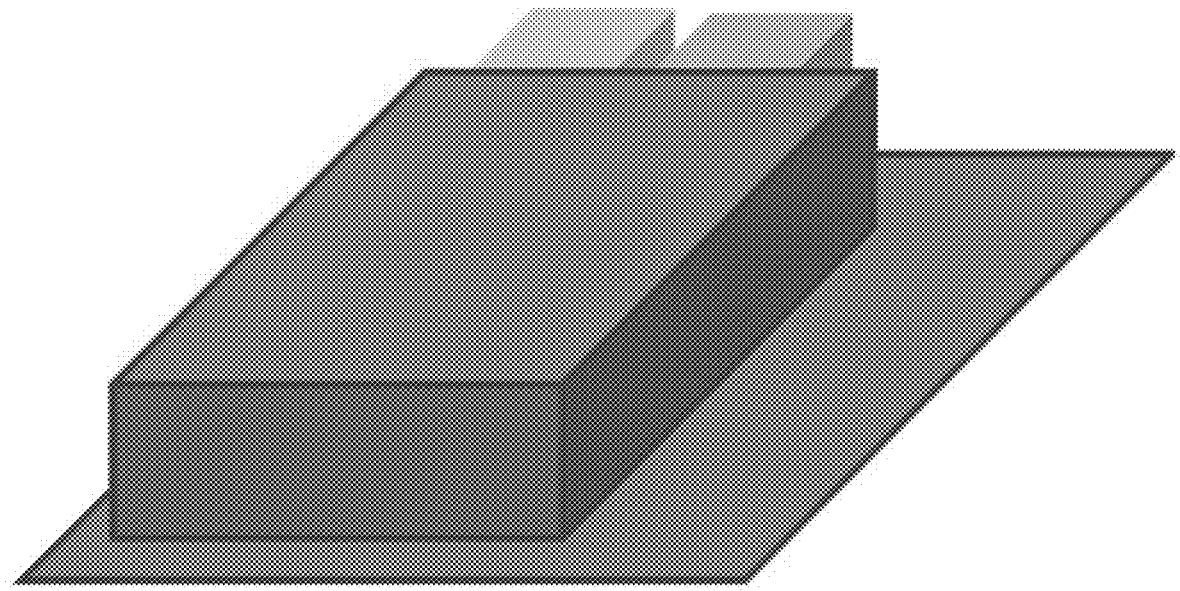
FIG. 1 is a mimetic diagram presenting a method of injecting an electrolyte liquid according to examples and comparative examples of the present invention.

Hereinafter, the present invention will be described in detail with reference to accompanying drawings so that those skilled in the art may readily implement the present invention. However, the present invention may be implemented in various different forms, and is not limited to the present specification.

In the drawings, parts not relevant to the descriptions are not included in order to clearly describe the present invention, and like reference numerals are used for like elements throughout the specification. In addition, sizes and relative sizes of constituents presented in the drawings are unrelated to actual scales, and may be reduced or exaggerated for clarity of the descriptions.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

In a lithium secondary battery, a process of injecting an electrolyte liquid is performed after storing an electrode assembly in a battery case. Such an electrolyte liquid injection requires a proper amount of injection. When injecting an electrolyte liquid in excess, lithium polysulfide (LiPS) elution increases accelerating lifetime degradation. In addition, when injecting a small of amount of an electrolyte liquid, performance may not be properly obtained due to an overvoltage. In addition thereto, even when a proper amount of an electrolyte liquid is injected, the electrolyte liquid is depleted by a volume expansion of a negative electrode as a cycle progresses causing an overvoltage, which leads to a problem of cell degradation. In order to resolve such problems, a proper amount of an additional electrolyte liquid needs to be injected at a proper point in time.

Method for Enhancing Lifetime of Lithium Secondary Battery

In view of the above, the present invention provides a method for enhancing a lifetime of a lithium secondary battery additionally injecting an electrolyte liquid in order to enhance lifetime properties of the lithium secondary battery.

The method for enhancing a lifetime of a lithium secondary battery of the present invention includes a) manufacturing a battery by injecting an electrolyte liquid to an electrode assembly-embedded battery; and b) charging and discharging the manufactured battery, and additionally injecting an electrolyte liquid earlier than half a cycle point with respect to the number of charge and discharge cycles reaching discharge capacity of 80% compared to initial capacity.

First, the method for enhancing a lifetime of a lithium secondary battery of the present invention includes a) preparing a battery by injecting an electrolyte liquid to an electrode assembly-embedded battery.

In the step a), the electrolyte liquid is injected at room temperature without any additional pressure change, and may be injected using commonly known methods in a lithium secondary battery manufacturing process without particular limit.

Herein, in the step a), it is preferred that an initial level of the electrolyte liquid is adjusted so that the electrode assembly is not exposed above the electrolyte liquid, and the electrolyte liquid is sufficiently introduced. This allows the whole electrode assembly to be completely immersed in the electrolyte liquid, and through vacuum treatment to describe later, the electrolyte liquid may be evenly impregnated across the top, bottom, left and right of the electrode assembly, and may be effectively impregnated into the electrode assembly within a short period of time.

The electrode assembly used in the step a) generally includes one or more unit cells, the unit cell having a positive electrode formed with a positive electrode active material and a positive electrode current collector, a negative electrode formed with a negative electrode active material and a negative electrode current collector, and a separator blocking electrical contact between the positive electrode and the negative electrode and through which lithium ions may migrate as a basic structure.

In the present invention, the unit cell may be a lithium secondary battery cell.

The lithium secondary battery cell is formed with a positive electrode; a negative electrode; and an electrolyte liquid between the positive electrode and the negative electrode for conducting lithium ions, and follows common modes in the art without particular limit.

The positive electrode may use sulfur series materials such as elemental sulfur (Se), $Li_2Sn$ (n≥1), organosulfur compounds or carbon-sulfur polymers (($C_2S_x$)$_n$: x=2.5 to 50, n≥2) as the positive electrode active material. The negative electrode may use materials capable of reversibly intercalating or deintercalating lithium ions, materials capable of reversibly forming lithium-containing compounds by reacting with lithium ions, lithium metal, lithium alloys or the like as the negative electrode active material.

In the present invention, the electrode assembly may be manufactured using common methods known in the art, and the shape of the electrode assembly is not particularly limited as well, and examples thereof may include a winding-type, a stack-type or a stack/folding type.

The winding-type electrode assembly is manufactured by coating an electrode active material and the like on metal foil used as a current collector, drying and pressing the result, and then cutting the result to a band shape having target width and length, and, after separating a negative electrode and a positive electrode using a separator, winding the result in a spiral form.

The stack-type electrode assembly has a structure of consecutively laminating a number of positive electrode and negative electrode unit cells, and has an advantage in that a rectangular shape is readily obtained, however, there are disadvantages in that the manufacturing process is complicated, and the electrode is pushed when an impact is applied causing a short circuit.

As an electrode assembly having an advanced structure that is a mixing type of the winding-type and the stack-type, an electrode assembly having a structure of folding a full cell or a bicell having a certain unit size using a long continuous separation film is considered. The electrode assembly having such a structure has a structure combining existing folding-type and stack-type, and is referred to as a 'stack/folding-type electrode assembly'.

The 'full cell' is a unit cell formed with a unit structure of positive electrode/separator/negative electrode, and is a cell in which a positive electrode and a negative electrode are each located on both sides of the cell. Such a full cell may include a most basic-structured positive electrode/separator/negative electrode cell, a positive electrode/separator/negative electrode/separator/positive electrode/separator/negative electrode cell and the like. In order to form an electrochemical cell using such a full cell, a number of the full cells need to be laminated so that the positive electrode and the negative electrode face each other while having the separation film provided therebetween.

The 'bicell' is a unit cell having the same electrode located on both sides of the cell as in a unit structure of positive electrode/separator/negative electrode/separator/positive electrode and a unit structure of negative electrode/separator/positive electrode/separator/negative electrode. In order to form an electrochemical cell using such a bicell, a number of the bicells need to be laminated so that the positive electrode/separator/negative electrode/separator/positive electrode-structured bicell (positive electrode bicell) and the negative electrode/separator/positive electrode/separator/negative electrode-structured bicell (negative electrode bicell) face each other while having the separation film provided therebetween. In some cases, more numbers of the bicells may be laminated, and for example, bicells having structures of positive electrode/separator/negative electrode/separator/positive electrode/separator/negative electrode/separator/positive electrode and negative electrode/separator/positive electrode/separator/negative electrode/separator/positive electrode/separator/negative electrode may be used.

More details on the electrode assembly having a stack/folding-type structure are disclosed in Korean Patent Application Laid-Open Publication Nos. 2001-0082058, 2001-0082059 and 2001-0082060 applied by the applicants of the present application, and the applications are incorporated herein by reference.

The electrode assembly in the present invention may be a unidirectional cell having a positive electrode tab and a negative electrode tab located in the same direction, or a bidirectional cell having a positive electrode tab and a negative electrode tab located in an opposite direction. Specifically, when a cell is immersed horizontally into a container holding an electrolyte liquid, it may be used in both a unidirectional cell and a bidirectional cell. However, when a cell is immersed vertically into a container holding an electrolyte liquid, a tab and a lead on one side of a positive electrode or a negative electrode are in direct contact with an electrolyte liquid in a bidirectional cell causing corrosion, and therefore, vertical immersion is more preferably used in a unidirectional cell only.

In the present invention, the battery has an electrode assembly with the constitutions and the shapes described above embedded in a battery case. The battery case is for storing an electrode assembly and is not particularly limited, and may be a cylinder-type, a coin-type, a square-type or a pouch-type made of a can. Preferably, the battery case may be a pouch-type.

The pouch-type case is formed with a pair of laminate sheets having a structure in which three sides are sealed, and has advantages of being light and readily manufactured.

The laminate sheet may be formed with a laminated structure of an outer resin layer, an air and moisture barrier metal layer and a heat-sealable inner resin layer.

The outer resin layer needs to have excellent resistance against the external environment, and needs to have tensile strength and weatherability of a certain level or higher. In such an aspect, the polymer resin of the outer coating layer may include polyethylene naphthalate (PEN), polyethylene terephthalate (PET) or oriented nylon having excellent tensile strength and weatherability.

The outer coating layer may be formed with polyethylene naphthalate (PEN) and/or may be formed with a structure in which a polyethylene terephthalate (PET) layer is provided on an outer surface of the outer coating layer.

The polyethylene naphthalate (PEN) has excellent tensile strength and weatherability even with a low thickness compared to polyethylene terephthalate (PET), and therefore, is preferably used as the outer coating layer.

As the polymer resin of the inner resin layer, polymer resins having heat sealability (heat adhesiveness), having low hygroscopicity for an electrolyte liquid to suppress electrolyte liquid penetration, and not swollen or eroded by an electrolyte liquid may be used, and more preferably, the polymer resin may be formed with a non-oriented polypropylene film (CPP).

As one example, the laminate sheet according to the present invention may be formed in a structure in which the outer coating layer has a thickness of 5 µm to 40 µm, the barrier layer has a thickness of 20 µm to 150 µm, and the inner sealant layer has a thickness of 10 µm to 50 µm. When each of the layers of the laminate sheet is too thin, it is difficult to expect barrier function for materials and strength improvement, and each of the layers being too thick is not preferred since processability declines and an increase in the sheet thickness is caused.

Next, the method for enhancing a lifetime of a lithium secondary battery of the present invention includes b) charging and discharging the manufactured battery, and additionally injecting an electrolyte liquid earlier than half a cycle point with respect to the number of charge and discharge cycles reaching discharge capacity of 80% compared to initial capacity.

The inventors of the present invention have identified that, when charge and discharge are progressed after manufacturing a lithium secondary battery, discharge capacity degenerates after a certain cycle point declining lifetime properties, and have specified the point at which discharge capacity degenerates as above to a point having discharge capacity of 80% compared to initial capacity. After specifying the number of charge and discharge cycles at a point having discharge capacity of 80% compared to initial capacity, an electrolyte liquid is additionally injected at a point earlier than a point having half the number of cycles of the above-mentioned specific number of cycles, and as a result, discharge capacity is recovered again and a degeneration rate of the recovered discharge capacity may slow down. When an electrolyte liquid is additionally injected at a point later than a point having half the number of cycles of the above-mentioned specific number of cycles, discharge capacity may be temporarily recovered followed by the electrolyte liquid injection, however, discharge capacity is immediately degenerated again at a rapid rate.

In the step b), the cycle point becoming half the number of charge and discharge cycles having discharge capacity of 80% compared to initial capacity may be, for example, a 20 to 30 cycle point, but is not limited thereto.

In addition, the amount of an electrolyte liquid additionally injected in the step b) may be from 50% by volume to 100% by volume and preferably from 60% by volume to 80% by volume with respect to the initially injected electrolyte liquid. When the amount of the injected electrolyte liquid is larger than 100% by volume, lithium polysulfide elution increases accelerating lifetime degradation, and when the amount is smaller than 50% by volume, the degree of enhancing lifetime properties is not sufficient due to an overvoltage.

As the electrolyte liquid used in the lithium secondary battery of the present invention, an ether-based electrolyte liquid may be used. Using a carbonate-based electrolyte liquid generally used in a lithium secondary battery has problems in that driving is difficult due to low solubility of sulfur, and efficiency of Li, a negative electrode, decreases as well.

Such an ether-based electrolyte liquid is not particularly limited as long as it is an ether-based electrolyte liquid, but one or more selected from among dibutyl ether, 2-methyl-tetrahydrofuran, tetrahydrofuran, dimethyl ether, ethylene glycol dimethyl ether, diethylene glycol dimethyl ether, diethylene glycol diethyl ether, triethylene glycol dimethyl ether and triethylene glycol diethyl ether may be preferably used.

Lithium Secondary Battery

In addition, the present invention provides a lithium secondary battery manufactured using the above-described method.

As one embodiment of the present invention, the lithium secondary battery may include a positive electrode; a negative electrode including lithium metal or a lithium alloy as a negative electrode active material; a separator provided between the positive electrode and the negative electrode; and an electrolyte liquid impregnated in the negative electrode, the positive electrode and the separator.

In addition, the lithium secondary battery of the present invention may be a lithium-sulfur battery including a sulfur compound in the positive electrode active material in the positive electrode.

The negative electrode may use materials capable of reversibly intercalating or deintercalating lithium ions ($Li^+$), materials capable of reversibly forming lithium-containing compounds by reacting with lithium ions, lithium metal, lithium alloys or the like as the negative electrode active material. Examples of the material capable of reversibly intercalating or deintercalating lithium ions may include crystalline carbon, amorphous carbon or mixtures thereof. Examples of the material capable of reversibly forming lithium-containing compounds by reacting with lithium ions may include tin oxide, titanium nitrate or silicon. Examples of the lithium alloy may include alloys of lithium and metals selected from the group consisting of Na, K, Rb, Cs, Fr, Be, Mg, Ca, Sr, Ba, Ra, Al and Sn.

In addition, during charging and discharging the lithium secondary battery, sulfur used as the positive electrode active material may be changed into to an inactive material and attached on the lithium negative electrode surface. Such inactive sulfur means sulfur gone through many electrochemical or chemical reactions and no longer able to participate in an electrochemical reaction of the positive electrode. Inactive sulfur formed on the lithium negative electrode surface has an advantage of performing a role of a protective layer of the lithium negative electrode. Accordingly, lithium metal and inactive sulfur formed on this lithium metal, for example, lithium sulfide, may be used as the negative electrode.

In addition to the negative electrode active material, the negative electrode of the present invention may further include a pretreatment layer formed with a lithium ion conducting material, and a lithium metal protective layer formed on the pretreatment layer.

The separator provided between the positive electrode and the negative electrode separates or insulates the positive electrode and the negative electrode from each other, and enables lithium ion transport between the positive electrode and the negative electrode, and may be formed with porous non-conductive or insulating materials. Such a separator is an insulator having high ion permeability and mechanical strength, and may be an independent member such as a thin membrane or a film, or a coating layer added to the positive electrode and/or the negative electrode. In addition, when using a solid electrolyte such as a polymer as an electrolyte, the solid electrolyte may also function as the separator.

The separator may generally have a pore diameter of 0.01 μm to 10 μm, and may generally have a thickness of generally 5 μm to 300 μm preferably, and as such a separator, a glass electrolyte, a polymer electrolyte, a ceramic electrolyte or the like may be used. For example, sheets, non-woven fabrics, kraft papers and the like made of olefin-based polymers such as polypropylene, glass fiber, polyethylene or the like having chemical resistance and hydrophobicity may be used. Typical examples of current commercial products thereof may include Celgard series (Celgard®2400, 2300 products of Hoechest Celanese Corp.), polypropylene separator (products of Ube Industries Ltd. or products of Pall RAI), polyethylene series (Tonen or Entek) and the like.

An electrolyte separator in a solid state may also include a non-aqueous organic solvent in less than approximately 20% by weight, and may further include a proper gel-forming compound (gelling agent) in this case for decreasing fluidity of the organic solvent. Typical examples of such a gelling agent may include polyethylene oxide, polyvinylidene fluoride, polyacrylonitrile and the like.

The electrolyte impregnated in the negative electrode, the positive electrode and the separator is a non-aqueous electrolyte containing a lithium salt, and is formed with a lithium salt and an electrolyte liquid, and as the electrolyte liquid, an ether-based electrolyte liquid may be used as described above.

The lithium salt of the present invention is a material readily dissolved in a non-aqueous organic solvent, and examples thereof may include one or more selected from the group consisting of LiSCN, LiCl, LiBr, LiI, $LiPF_6$, $LiBF_4$, $LiSbFE$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, chloroborane lithium, lower aliphatic carboxylic acid lithium, lithium tetraphenylborate, lithium imide and combinations thereof.

The concentration of the lithium salt may be from 0.2 M to 2 M, specifically from 0.6 M to 2 M and more specifically from 0.7 M to 1.7 M depending on various factors such as an accurate composition of the electrolyte mixture, solubility of the salt, conductivity of the dissolved salt, charge and discharge conditions of a battery, a working temperature, and other factors known in the lithium battery field. When the lithium salt is used in less than 0.2 M, conductivity of the electrolyte may decrease causing decline in the electrolyte performance, and when the lithium salt is used in greater than 2 M, viscosity of the electrolyte increases leading to a decrease in the lithium ion ($Li^+$) mobility.

In addition, the present invention provides a battery module including the lithium secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

Example

Manufacture of Lithium Secondary Battery

Comparative Example 1

Sulfur and carbon nanotube were mixed in 7:3 and then heat treated to prepare a sulfur/carbon composite. Using the prepared sulfur/carbon composite, the sulfur-carbon composite:binder (use PAA):conductor (CNT) were mixed in a weight ratio of 88:5:7 to prepare slurry, and the slurry was coated on an aluminum foil current collector having a thickness of 20 μm to prepare a positive electrode. With the prepared positive electrode, lithium metal was used as a negative electrode, a PE separator, a separator for a general LIB, was provided between the negative electrode and the positive electrode, and an electrolyte liquid prepared by adding 1 M LiTFSI and 1 wt % $LiNO_3$ as a lithium salt to a dimethyl ether electrolyte liquid was injected to prepare an electrode assembly, and then the electrode assembly was embedded in a pouch to manufacture a pouch-type battery case as illustrated in FIG. 1.

After that, for the manufactured lithium secondary battery, a cycle lifetime test was performed with a charge and discharge voltage range of 1.5 V to 2.8 V and a rate of 0.1 C discharge and 0.1 C charge, and it was identified that cycle capacity started to degenerate near a $50^{th}$ cycle.

Specifically, initial capacity was 1195 mAh/g, and the number of the charge and discharge cycles reaching 80% of such initial capacity was a $50^{th}$ cycle.

Example 1

For the lithium secondary battery manufactured in the same manner as in Comparative Example 1, an electrolyte liquid was additionally injected in the same volume as the initially injected electrolyte liquid at a $25^{th}$ cycle point corresponding to half the $50^{th}$ cycle at which cycle capacity started to degenerate.

Comparative Example 2

An experiment was performed in the same manner as in Example 1 except that an electrolyte liquid was additionally injected at a $53^{rd}$ cycle point.

Comparative Example 3

An experiment was performed in the same manner as in Example 1 except that an electrolyte liquid was additionally injected at a $68^{th}$ cycle point.

Comparative Example 4

An experiment was performed in the same manner as in Example 1 except that an electrolyte liquid was additionally injected at a $85^{th}$ cycle point.

Experimental Example: Evaluation on Battery Properties

For the additionally-injected batteries of Example 1 and Comparative Examples 2 to 4, a cycle lifetime test was performed in the same manner as in Comparative Example 1, and the results are shown in FIG. 2.

When examining the cycle lifetime test results of FIG. 2, it was seen that Example 1 additionally injecting an electrolyte liquid at a $25^{th}$ cycle point had cycle capacity starting to degenerate again at a $75^{th}$ cycle point and had a cycle lifetime enhanced by approximately 50% (25 cycles) compared to Comparative Example 1.

In comparison, Comparative Example 2 additionally injecting an electrolyte liquid at a $53^{rd}$ cycle that is after degeneration started, Comparative Example 3 additionally injecting an electrolyte liquid at a $68^{th}$ cycle, a point at which cycle capacity was approximately 400 mAh/g after degeneration started, and lastly, Comparative Example 4 additionally injecting an electrolyte liquid near a $85^{th}$ cycle, a point at which the cell was considered to be completely degenerated with cycle capacity of approximately 200 mAh/g had cycle capacity temporarily enhanced after the injection, however, the cycle capacity rapidly degenerated, and results of increasing a cycle lifetime as in Example 1 were not able to be obtained.

The invention claimed is:
1. A method for enhancing a lifetime of a lithium secondary battery comprising:
   a) manufacturing the battery by initially injecting an electrolyte liquid to an electrode assembly embedded in a battery case;
   b) charging and discharging the manufactured battery; and
   c) injecting an additional amount of electrolyte liquid into the manufactured battery at a first cycle point that is earlier than half a cycle point in which a number of charge and discharge cycles causes the manufacture battery to reach a discharge capacity of 80% compared to an initial capacity of the manufactured battery.

2. The method for enhancing a lifetime of a lithium secondary battery of claim 1, wherein the additional amount of the injected electrolyte liquid is from 50% by volume to 100% by volume with respect to an amount of the initially injected electrolyte liquid.

3. The method for enhancing a lifetime of a lithium secondary battery of claim 1, wherein the first cycle point is a 20 to 30 cycle point.

4. The method for enhancing a lifetime of a lithium secondary battery of claim 1, wherein the electrolyte liquid is an ether-based electrolyte liquid.

5. The method for enhancing a lifetime of a lithium secondary battery of claim 4, wherein the ether-based electrolyte liquid is one or more selected from the group consisting of dibutyl ether, 2-methyltetrahydrofuran, tetrahydrofuran, dimethyl ether, ethylene glycol dimethyl ether, diethylene glycol dimethyl ether, diethylene glycol diethyl ether, triethylene glycol dimethyl ether and triethylene glycol diethyl ether.

6. The method for enhancing a lifetime of a lithium secondary battery of claim 1, wherein the electrode assembly is a winding-type, a stack-type, or a stack/folding-type.

7. The method for enhancing a lifetime of a lithium secondary battery of claim 1, wherein the electrode assembly is a unidirectional cell or a bidirectional cell.

8. The method for enhancing a lifetime of a lithium secondary battery of claim 1, wherein the battery case is a pouch-type formed with a pair of laminate sheets having a structure in which three sides are sealed so as to accommodate the electrode assembly therein.

9. The method for enhancing a lifetime of a lithium secondary battery of claim 1, wherein the manufactured battery includes a positive electrode; a negative electrode including lithium metal or a lithium alloy as a negative electrode active material; a separator provided between the positive electrode and the negative electrode, wherein the electrolyte liquid is impregnated in the negative electrode, the positive electrode and the separator, and wherein a sulfur compound is included in a positive electrode active material of the positive electrode.

* * * * *